July 7, 1942. L. F. PHANEUF 2,289,295
LEVEL INDICATOR FOR STORAGE TANKS
Filed Aug. 27, 1940 2 Sheets-Sheet 2
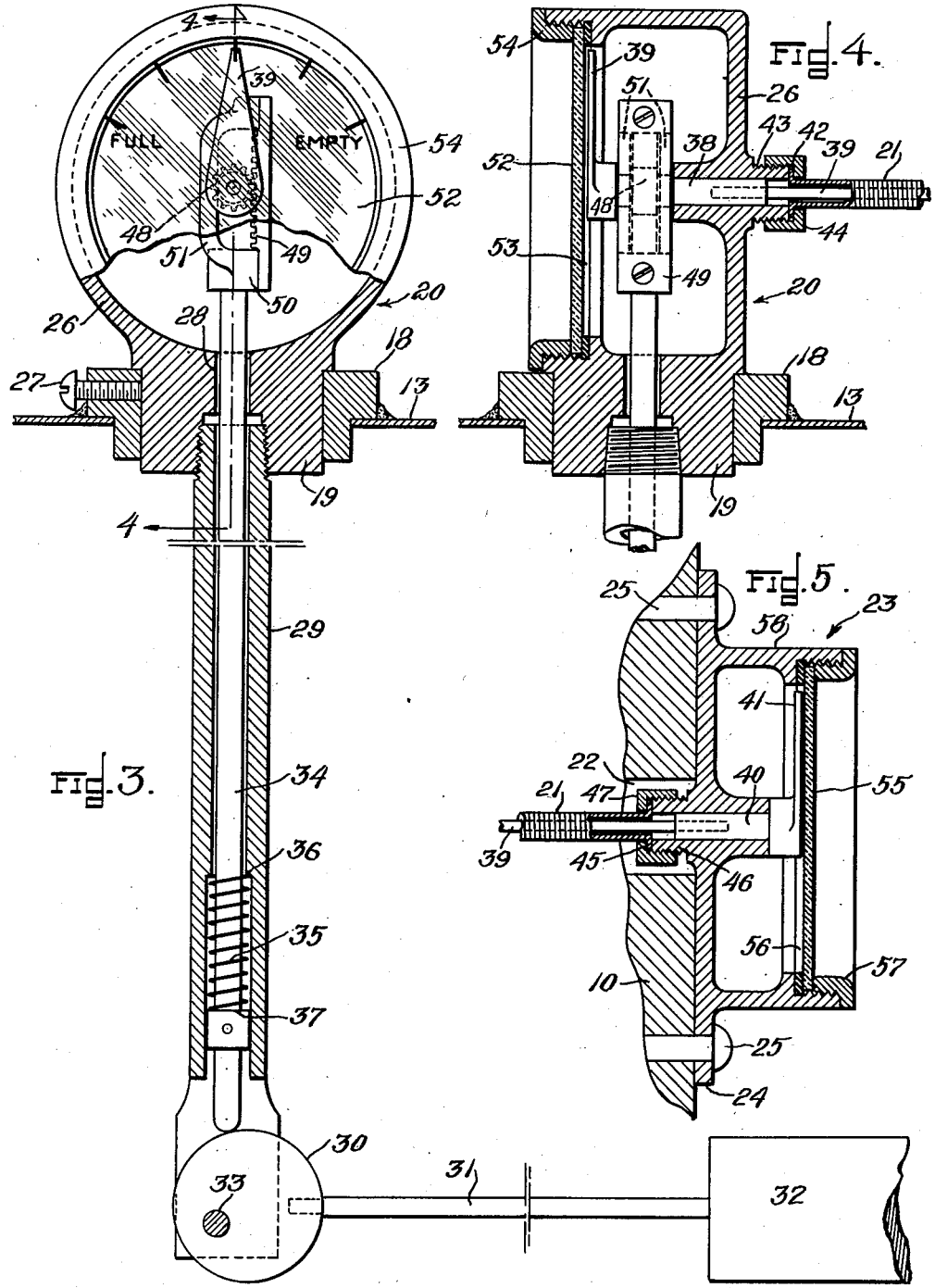
INVENTOR.
Leo F. Phaneuf
BY Arthur F. Randall, Atty.

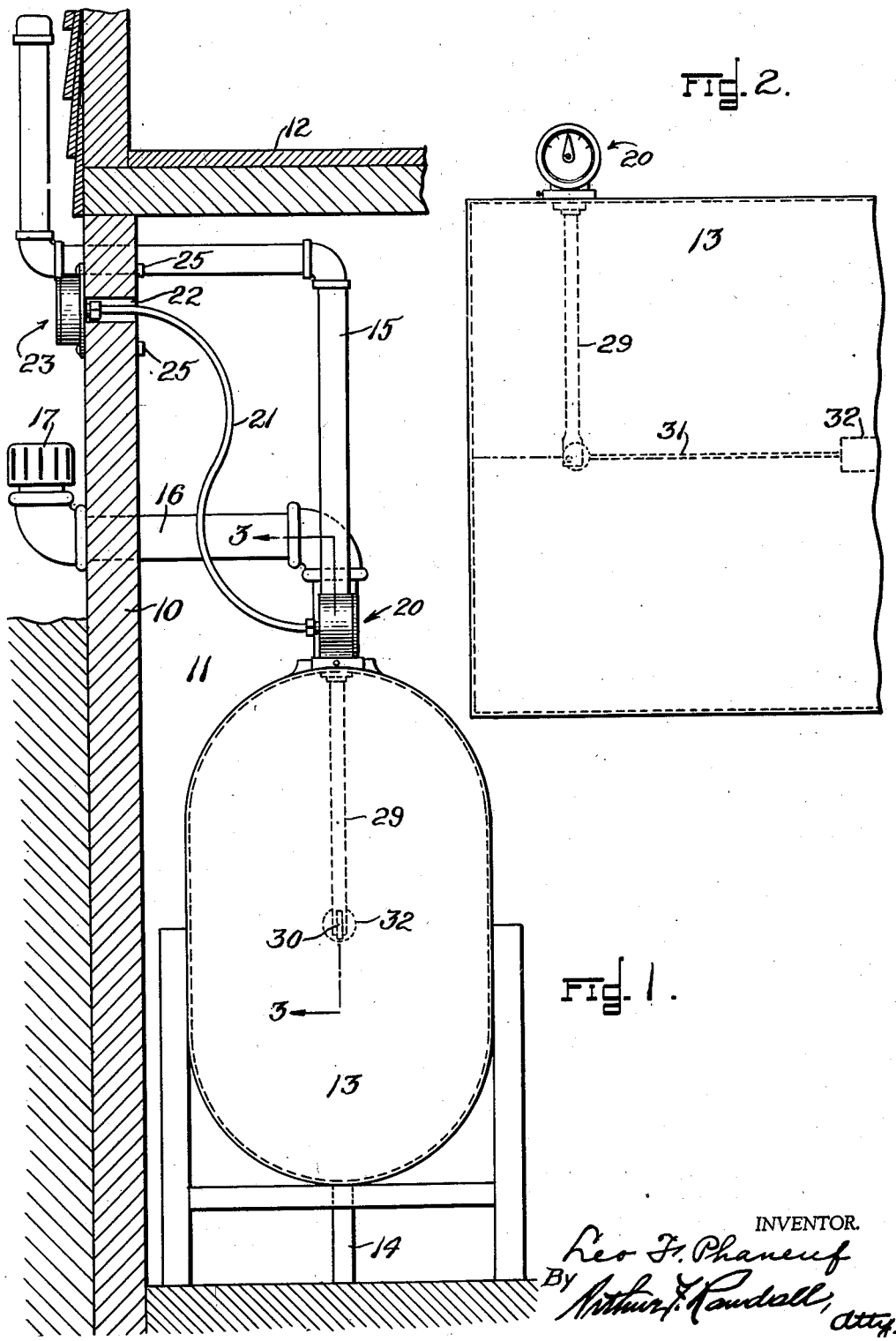

Patented July 7, 1942

2,289,295

UNITED STATES PATENT OFFICE 2,289,295

LEVEL INDICATOR FOR STORAGE TANKS

Leo F. Phaneuf, New Bedford, Mass.

Application August 27, 1940, Serial No. 354,334

1 Claim. (Cl. 73—318)

My invention relates to improvements in gauge apparatus for fuel supply reservoirs such as are disposed within a building and equipped with means for filling the same from the outside of the building.

An object of the invention is to provide an improved gauge apparatus of the class indicated which will, at all times, disclose or indicate to an occupant of the building, and also to a person upon the outside of the latter, the amount of oil that is within the reservoir.

It is also an object of this invention to provide a gauge apparatus of the character just described which will be of simple, inexpensive and efficient construction.

To these ends I have provided an improved gauge apparatus of the class described having the features of construction and operation set forth in the following description, the several novel features of the invention being separately pointed out and defined in the claims at the close of said description.

In the accompanying drawings:

Figure 1 is a vertical sectional view of a portion of a building containing a fuel supply reservoir provided with a gauge apparatus constructed in accordance with my invention.

Figure 2 is a side elevation of one end of the tank shown in Fig. 1.

Figure 3 is a section on line 3—3 of Fig. 1, drawn on larger scale.

Figure 4 is a section on line 4—4 of Fig. 3.

Figure 5 is a sectional view of the outside fitting, hereinafter described.

In the accompanying drawings, 10 represents one of the walls of a building, 11 a basement room or cellar and 12 the first floor of the building. Within the room 11 is arranged a fuel oil reservoir 13 from which fuel oil is withdrawn through a pipe 14 for use within the building.

Reservoir 13 is provided, as usual, with a vent pipe 15 and filler pipe 16 leading to the exterior of the building, the outer end of pipe 16 being normally closed by a removable cap 17.

The reservoir 13 ordinarily has a capacity of several hundred gallons and when the supply of oil within the same is to be replenished it is customary to convey the oil to the building in a tank wagon or truck from which the oil is delivered through a hose into the outer end of the filler pipe 16 to which said hose is attached after removal of cap 17.

In accordance with my invention the reservoir 13 is constructed at its top (Figs. 3 and 4) with a bushing 18 into which is fitted a boss 19 forming part of a hollow terminal fitting 20 provided at one end of a flexible tubular metallic sheath 21.

This tubular sheath extends upwardly from fitting 20 through an opening 22 in wall 10 (Figs. 1 and 5) to the outside of the latter where its outer end is provided with a hollow terminal fitting 23.

The fitting 23 is made with a base flange 24 fastened in position upon the outside of wall 10 by bolts 25.

The fitting 20 comprises a hollow body 26 on which the boss 19 is formed, said boss being fixedly clamped within bushing 18 by a set screw 27. Shellac or other suitable cement is applied to boss 19 before inserting it within the bushing in order to seal the joint between the two.

The boss 19 is made with a hole 28 extending vertically therethrough and the lower end of said hole is threaded to receive within it the upper exteriorly threaded end of a tubular stem 29. The lower end of stem 29 is forked and within said fork is arranged the disk-like hub 30 of a lever 31 carrying at its free end a float 32. The hub 30 is of circular shape and eccentrically pivoted at 33 within the forked lower end of stem 29.

A slide-bar 34 is movably mounted within the tubular stem 29 and its lower end is yieldingly held against the periphery of hub 30 by a spring 35. This spring is disposed within the lower end of tubular stem 29 between a shoulder 36 on said stem and a shoulder 37 provided on slide-bar 34. It will be clear that as the float 32 moves up and down with variations in the level of the contents of reservoir 13, the eccentric hub 30 is rotated or oscillated on its pivot 33 and acts to reciprocate slide-bar 34.

The rear wall of the body 26 of the fitting 20 is formed at its middle with an aperture within which is rotatably mounted a short spindle 38 whose front end is provided with a pointer 39 and whose rear end is made with an axial socket within which one end of a flexible shaft 39 is soldered or otherwise secured.

The rear wall of the body 58 of the outside fitting 23 is formed at its middle with an aperture within which is rotatably mounted a short spindle 40 whose outer or front end is provided with a pointer 41 and whose rear or inner end is made with an axial socket within which the opposite end of the flexible shaft 39 is soldered or otherwise secured.

At one end thereof the flexible tubular sheath 21 is provided with a radial flange 42 (Fig. 4)

which is tightly clamped by means of an interiorly threaded cap 44 against the outer end of an exteriorly threaded nipple 43 projecting from the rear wall of fitting 20. At its opposite end (Fig. 5) the sheath 21 is provided with a radial flange 45 which is tightly clamped by means of an interiorly threaded cap 47 against the outer end of an exteriorly threaded nipple 46 provided upon the exterior of the rear wall of the outside fitting 23.

The short shaft 38 (Fig. 4) of the inside fitting 20 is made with a small spur pinion 48 meshing with a rack 49 provided at the upper end of slide-bar 34.

The rack 49 is fastened by screws to a head 50 forming part of the slide-bar 34 and this head is made with two bars 51 disposed at opposite sides of the pinion 48 and in contact with the side of the short shaft 38 so as to hold the rack 49 in mesh with the pinion as the slide-bar 34 is moved up and down by the float lever.

The front wall of the inside fitting 20 consists of a pane of glass 52 whose marginal portion is clamped against a resilient gasket 53 by an exteriorly threaded ring 54, said ring being screwed into the hollow body 26 which is interiorly threaded to receive it. The front wall of the outside fitting 13 likewise consists of a pane of glass or other transparent material 55 clamped in position against a resilient gasket 56 by an exteriorly threaded ring 57, the hollow body 58 of said outside fitting 23 being interiorly threaded to receive said ring.

The transparent front walls of both fittings 20 and 23 may, as shown in Fig. 3, be calibrated so that the positions of the pointers of said fittings relatively to said calibrations, are indicative of the level of the contents of reservoir 13.

As will be clear, up and down movement of the slide-bar 34 effected by the float lever under the influence of variations of the level of the liquid within the reservoir, acts through rack 49 and pinion 48 to angularly adjust both pointers or indicator elements 39 and 41 simultaneously relatively to the calibrations with which each cooperates.

From the above description it will be clear that, at all times, an occupant of the building is informed by the inside fitting 20 as to the quantity of oil within the reservoir. Also, a person upon the outside of the building is informed by the outside fitting 23 as to the quantity of oil within the reservoir. It is also true that while the supply of oil within the reservoir is being replenished through the filler pipe 16, the truckman who is delivering the oil may avoid overloading said reservoir by stopping the delivery of oil when the indicator element 41 nears or reaches the "full" position.

The tubular sheath 21 prevents buckling of the flexible shaft 39 and it will be apparent that said sheath, outside fitting 23, inside fitting 20 and reservoir 13 completely inclose all of the working parts of the gauge mechanism so that there is no opportunity for escape of vapors.

What I claim is:

A gauge apparatus for a liquid fuel supply reservoir, said apparatus including, in combination, a hollow fitting mounted on said reservoir and communicating with the interior of the latter, said fitting being provided with a stem extending downwardly therefrom into said reservoir; a vertically movable slide-bar supported by said stem; a flexible tubular sheath having one end thereof connected with, and communicating with the interior of, said fitting; a second hollow fitting located at a distance from said reservoir and with which second fitting the opposite end of said tubular sheath is connected so as to communicate with the interior thereof; a float lever pivotally mounted upon said stem adjacent to the lower end of the latter and made with a cam-shaped hub through which movement of said lever in response to variations in the level of the liquid fuel within said reservoir acts to move said bar endwise; a spring for yieldingly holding the lower end of said slide-bar against said cam-shaped hub; means through which endwise movement of said slide-bar acts to rotate said shaft, and two indicator elements each disposed within one of said fittings and connected with the proximate end of said shaft, each of said fittings being made with a transparent wall section through which its indicator element is visible from the exterior of said fitting.

LEO F. PHANEUF.